United States Patent
Han et al.

(10) Patent No.: US 10,563,777 B2
(45) Date of Patent: Feb. 18, 2020

(54) FLAT BOTTOM VALVE

(71) Applicant: ANHUI REDSTAR VALVE CO., LTD, Tongling (CN)

(72) Inventors: Anwei Han, Tongling (CN); Bin Song, Tongling (CN); Bin Zhang, Tongling (CN)

(73) Assignee: ANHUI REDSTAR VALVE CO., LTD, Tongling (CN)

( * ) Notice: Subject to any disclaimer, the term of this patent is extended or adjusted under 35 U.S.C. 154(b) by 156 days.

(21) Appl. No.: 15/742,008

(22) PCT Filed: Feb. 20, 2017

(86) PCT No.: PCT/CN2017/074129
§ 371 (c)(1),
(2) Date: Jan. 4, 2018

(87) PCT Pub. No.: WO2017/157134
PCT Pub. Date: Sep. 21, 2017

(65) Prior Publication Data
US 2018/0195626 A1    Jul. 12, 2018

(30) Foreign Application Priority Data

Mar. 14, 2016   (CN) .......................... 2016 1 0142318
Nov. 30, 2016   (CN) ..................... 2016 2 1297184 U
(Continued)

(51) Int. Cl.
*F16K 11/056*        (2006.01)
*F16K 5/20*          (2006.01)
(Continued)

(52) U.S. Cl.
CPC ............ *F16K 11/056* (2013.01); *F16K 1/205* (2013.01); *F16K 1/2057* (2013.01);
(Continued)

(58) Field of Classification Search
CPC .... F16K 11/056; F16K 27/0227; F16K 5/204; F16K 5/0673; F16K 1/2057; F16K 1/205; F16K 5/0684; F16K 5/201; F16K 1/14
See application file for complete search history.

(56) References Cited

U.S. PATENT DOCUMENTS 3,294,109 A * 12/1966 Smith ....................... E03B 9/04
                                                    137/298
3,379,408 A *  4/1968 Lowrey ................. F16K 5/0684
                                                    251/298
(Continued)

FOREIGN PATENT DOCUMENTS

CN        1409037        4/2003
CN        2752569        1/2006
(Continued)

OTHER PUBLICATIONS

Office Action and search report from Chinese Application No. 201610142318.2 dated Mar. 27, 2018 with English translation from Google.
(Continued)

*Primary Examiner* — Marina A Tietjen
(74) *Attorney, Agent, or Firm* — Ladas & Parry, LLP

(57) ABSTRACT

A flat bottom ball valve is provided in the present disclosure. According to an example, the flat bottom ball valve includes a valve body, a valve core, a valve rod, a bonnet and a flow path. The valve core is mounted inside the valve body. The valve rod is mounted on two opposite sides of the valve body, perpendicular to a liquid flow direction and capable of driving the valve core to turn over. The bonnet is movably mounted on the valve body and parallel to the valve rod. The flow path is defined inside the valve body and connects two ends of the valve body. The valve core includes a main body part, a connecting part formed by extending symmetrically from two sides of the main body part, an accessory defined (Continued)

on the main body part and a first mounting hole in the connecting part to engage with the valve rod. The valve core swings around the valve rod along a path above the valve rod and is capable of being hermetically engaged with the valve body to turn off/on the flow path. A horizontal center line of the main body part is parallel to a horizontal center line of the first mounting hole in the liquid flow direction of the flow path.

16 Claims, 6 Drawing Sheets

(30) Foreign Application Priority Data

Nov. 30, 2016 (CN) .................... 2016 2 1297185 U
Nov. 30, 2016 (CN) .................... 2016 2 1297191 U

(51) Int. Cl.
*F16K 1/20* (2006.01)
*F16K 5/06* (2006.01)
*F16K 27/02* (2006.01)
*F16K 1/14* (2006.01)

(52) U.S. Cl.
CPC .......... *F16K 5/0673* (2013.01); *F16K 5/0684* (2013.01); *F16K 5/204* (2013.01); *F16K 27/0227* (2013.01); *F16K 1/14* (2013.01); *F16K 5/201* (2013.01)

(56) References Cited

U.S. PATENT DOCUMENTS 3,854,761 A * 12/1974 David .................... F16J 15/021
                                                              285/336
3,893,469 A * 7/1975 Baker .................... F16K 5/0626
                                                              137/584
4,073,473 A    2/1978 Rihm et al.
5,176,172 A    1/1993 Ackroyd
2016/0138721 A1* 5/2016 Burgess .................... F16K 3/02
                                                              251/14

FOREIGN PATENT DOCUMENTS

| CN | 201162864 | 12/2008 | | |
|----|-----------|---------|---|---|
| CN | 201354858 Y | 12/2009 | | |
| CN | 202158234 U | 3/2012 | | |
| CN | 202646733 U | 1/2013 | | |
| CN | 203202316 U | 9/2013 | | |
| CN | 203614769 U | 5/2014 | | |
| CN | 205559814 U | 9/2016 | | |
| CN | 106382377 A | 2/2017 | | |
| GB | 851288 A | * | 10/1960 | ............... F16K 3/16 |
| JP | 11-190445 | 7/1999 | | |

OTHER PUBLICATIONS

From CN201610142318.2, Second Office Action, dated Sep. 19, 2018, with machine English translation from Global Dossier.
From PCT/CN2017/074129, Written Opinion of the International Searching Authority, dated May 25, 2017, with English translation from WIPO.
From PCT/CN2017/074129, Intenational Preliminary Report on Patentability, dated Sep. 18, 2018, with English translation from WIPO.
International Search Report for PCT/CN2017/074129, dated May 25, 2017, and its English translation provided by WIPO.
Written Opinion of the International Search Authority for PCT/CN2017/074129, dated May 25, 2017, and its English translation provided by Bing.com Microsoft Translator.

* cited by examiner

FLAT BOTTOM VALVE

CROSS REFERENCE TO RELATED APPLICATIONS

This application is the US National Phase of PCT application No. PCT/CN2017/074129, filed on Feb. 20, 2017, which claims priority to Chinese Patent Application No. 201610142318.2 entitled "NOVEL VALVE" filed on Mar. 14, 2016, Chinese Patent Application No. 201621297191.3 entitled "ECCENTRIC VALVE" filed on Nov. 30, 2016, Chinese Patent Application No. 201621297185.8 entitled "DEVICE FOR ADJUSTING VALVE CORE" filed on Nov. 30, 2016, and Chinese Patent Application No. 201621297184.3 entitled "SEALING RUBBER PAD AND ITS APPLICATION ON VALVE" filed on Nov. 30, 2016, the entire contents of which are incorporated herein by reference.

TECHNICAL FIELD

The present disclosure relates to a flat bottom ball valve in the valve field.

BACKGROUND

As shown in FIG. 1, an eccentric half-ball valve in the prior art includes a valve body, a valve rod mounted on the valve body, a sealed half-ball mounted inside the valve body and being connected with the valve rod, and a valve core connected with the sealed half-ball through a bolt. A flow path defined inside the valve body is complicated in structure, and a bottom end of the flow path may be uneven; after long-time use, rubbish may easily accumulated, which may influence the use of the valve and increase flow resistance. The valve core may be fixed on the sealed half-ball through the bolt, and bidirectional sealing may cause leakage. Moreover, the prior eccentric half-ball valve is complicated in structure, and the processing cost is high.

SUMMARY

Based on this, the present disclosure provides a flat bottom ball valve to improve the sealing property of the valve.

To achieve the above objective, the present disclosure provides a technical scheme below.

According to the present disclosure, the flat bottom ball valve may include:

a valve body;

a valve core mounted inside the valve body;

a valve rod mounted on two opposite sides of the valve body, the valve rod being perpendicular to a liquid flow direction and capable of driving the valve core to turn over;

a bonnet movably mounted on the valve body and parallel to the valve rod; and a flow path defined inside the valve body and connecting two ends of the valve body, where one of the two ends of the valve body is a water outlet, and the other is a water inlet;

where, the valve core includes:

a main body part;

a connecting part formed by extending symmetrically from two sides of the main body part;

an accessory defined on the main body part; and a first mounting hole in the connecting part and used for mounting the valve rod;

where, the valve core swings around the valve rod along a path above the valve rod, and the valve core is capable of being hermetically engaged with the valve body to turn off/on the flow path; and in a liquid flow direction of the flow path, a horizontal center line of the main body part is parallel to a horizontal center line of the first mounting hole.

In the present disclosure, the bonnet is movably mounted above the valve body to facilitate mounting and maintaining the valve core; a sealing ring of the breathing-type mounted on the valve core implements bidirectional self-sealing with water pressure, thereby saving energy and reducing consumption; a horizontal center line of the main body part of the valve core is parallel to a horizontal center line of the mounting hole in the valve core, i.e., the valve core has an eccentric structure; and when the valve is opened, the sealing ring can be quickly disengaged from the valve body to avoid abrasion of a sealing pair.

BRIEF DESCRIPTION OF THE DRAWINGS

FIG. 4b schematically illustrates a partial enlarged diagram of circle parts shown in FIG. 4a.

DETAILED DESCRIPTION OF THE EMBODIMENTS

The technical schemes of embodiments of the present disclosure are described clearly and completely below according to the drawings therein. Apparently, the embodiments described do not cover all embodiments of the present disclosure. Other embodiments acquired by those of ordinary skill in the art without paying creative work based on the embodiments of the present disclosure should fall within the protection scope of the present disclosure.

Example 1

Figure 1:
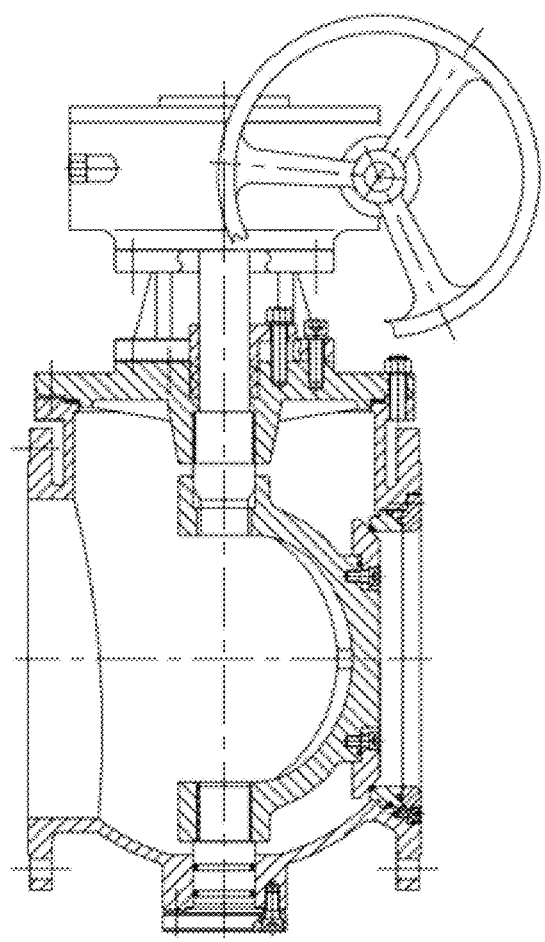
FIG. 1 schematically illustrates a structure of an eccentric half-ball valve in the prior art.
Figure 2:
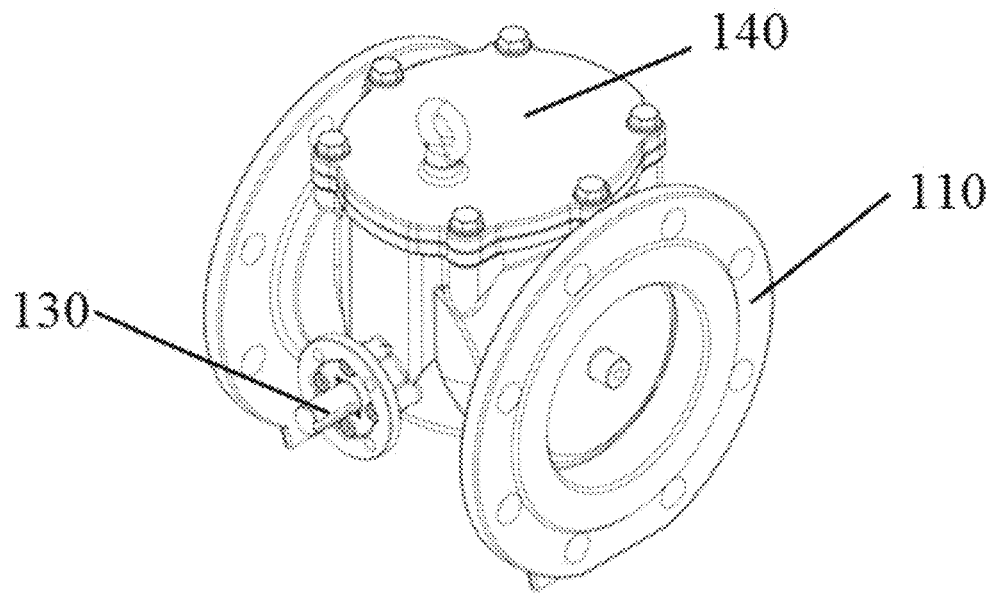
FIG. 2 schematically illustrates a structure of a flat bottom ball valve according to Example 1.

FIG. 2 schematically illustrates a structure of a flat bottom ball valve according to Example 1 of the present disclosure. As shown in FIG. 2, the flat bottom ball valve includes a valve body 110, a valve core 120 (not shown in FIG. 2) mounted inside the valve body 110, a valve rod 130 mounted on the valve core 120 and used to drive the valve core 120 to turn over, a bonnet 140 movably mounted above the valve body 110 and a flow path 150 (not shown in FIG. 2) defined inside the valve body 110 and connecting two ends of the valve body 110. The valve core 120 is capable of being hermetically engaged with the valve body 110 to turn off/on the flow path 150.

Figure 3:
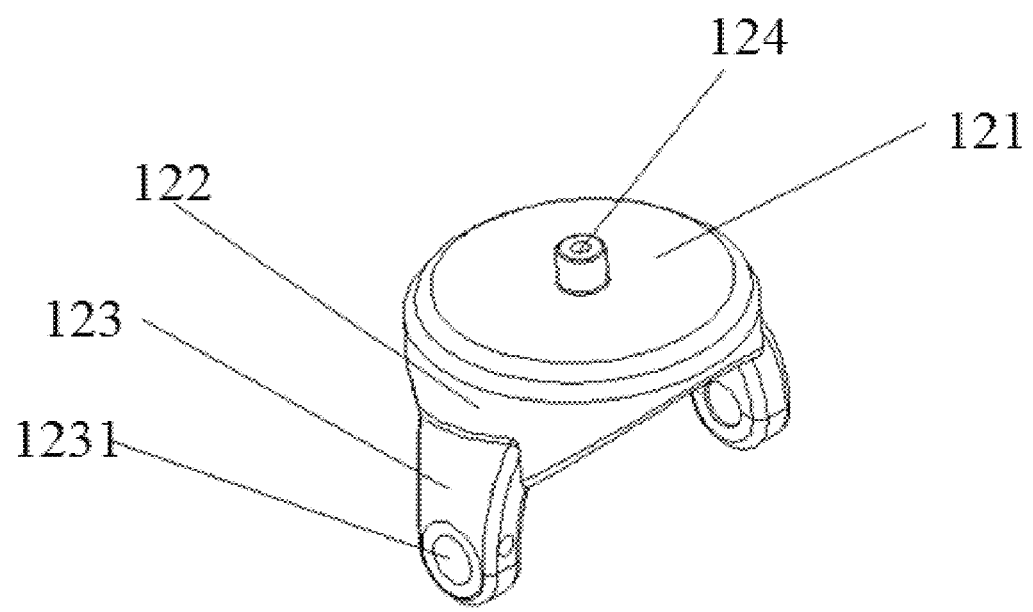
FIG. 3 schematically illustrates a structure of a valve core of the flat bottom ball valve shown in FIG. 2.

FIG. 3 schematically illustrates a structure of the valve core of the flat bottom ball valve shown in FIG. 2. As shown in FIG. 3, the valve 120 (not shown in FIG. 3) includes a disc-shaped main body part 121, a reinforcing surface 122 formed by extending vertically from the circumference of the main body part 121, a connecting part 123 formed by extending symmetrically from the two sides of the reinforcing surface 122, and an accessory 124 defined on the main body part 121. The main body part 121 and the reinforcing surface 122 may form a triangle in a liquid flow direction of the flow path 150. The reinforcing surface 122 may not only advantageously reinforce the seal fit between the valve core 120 and the valve body 110 but also facilitate on-off of the valve core 120. The connecting part 123 can be cooperatively connected with the valve rod 130. A mounting hole 1231 for being engaged with the valve rod 130 may be arranged in the connecting part 123. The accessory 124 may be defined at a circle center of the main body part 121 to facilitate mounting and removing the valve core 120.

Figure 4A:
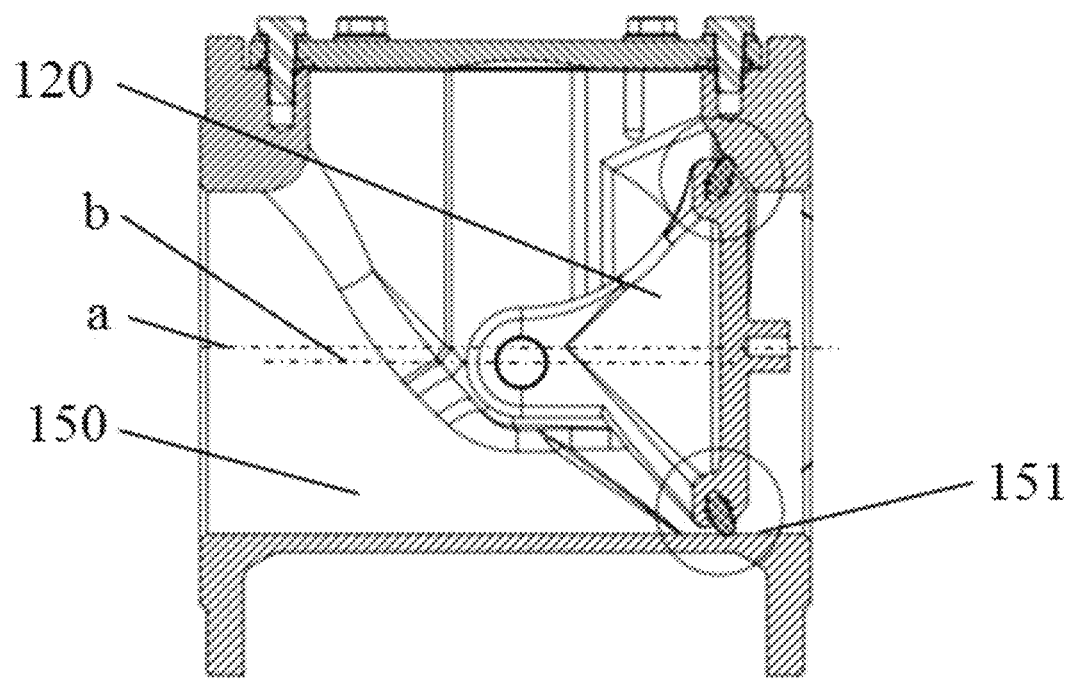
FIG. 4a schematically illustrates a section of the flat bottom ball valve shown in FIG. 2.
Figure 4B:
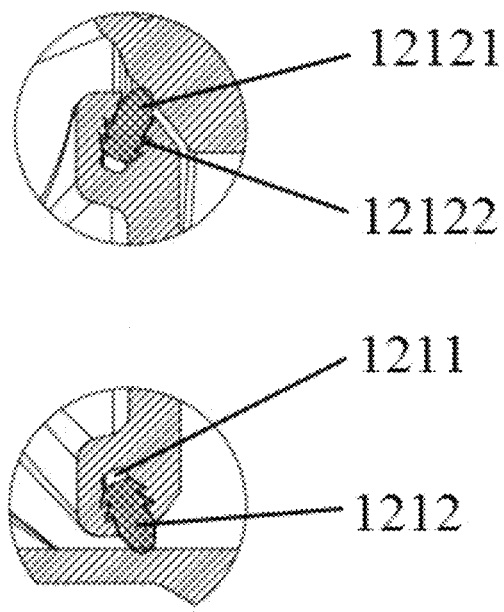

FIG. 4a schematically illustrates a section of the flat bottom ball valve shown in FIG. 2. FIG 4b illustrates a partial enlarged diagram of circle parts shown in FIG. 4a. As shown in FIG. 4b, the main body part 121 of the valve core 120 may be provided with an annular groove 1211 and a sealing ring 1212, the sealing ring 1212 may be mounted in the groove 1211 and abutted against the inside of the valve body 110. A gap may be left between the sealing ring 1212 and the groove 1211. The sealing ring 1212 and the valve body 110 may form a sealing pair. When the flat bottom ball valve is on, water may apply a pressure to the sealing ring 1212 with the action of water pressure along the gap, and the pressure may enhance the sealing of the sealing pair.

As shown in FIG. 4b, the sealing ring 1212 includes a sealing part 12121 and a plurality of fixing parts 12122 arranged on two sides of the sealing part 12121. A cross section of the respective fixing parts 12122 may be of a right-triangle shape. A plurality of fixing grooves (not shown in FIG. 4b) for accommodating the fixing parts 12122 may be concavely arranged in the groove 1211 of the main body part 121. A cross section of the respective fixing grooves may be also of a right-triangle shape. The groove 1211 may be of a dovetail groove structure.

The valve rod 130 may be arranged on two opposite sides of the valve body 110. For example, the valve rod 130 may be divided into a front valve rod and a rear valve rod; the front valve rod may be arranged on one side of the valve body 110; and the rear valve rod may be arranged on the other side of the valve body 110. The valve rod 130 may be mounted on the valve body 110 in a direction perpendicular to the liquid flow direction. The valve rod 130 may be parallel to the bonnet 140. The valve core 120 may be rotated between the bonnet 140 and the water inlet around the valve rod 130, so as to implement on-off of the flat bottom ball valve.

The bonnet 140 may be fixed on the valve body 110 through a plurality of bolts to facilitate mounting and removing the valve core 120.

A very bottom end of the cross section of the flow path 150 along the liquid flow direction may be a straight line. In the present disclosure, a lower half part of the flow path 150 may be a circular arc camber. In this way, the bottom end of the flow path is smooth, rubbish accumulation can be avoided, and a flow rate of the liquid in the flow path 150 is not influenced.

As shown in FIG. 4a, a valve port 151 for being engaged with the main body part 121 of the valve core 120 may be arranged on the flow path 150. The sealing ring 1212 may be abutted against the valve port 151 and form the sealing pair with the valve port 151. In this example, a valve seat and the valve body can be combined to simplify the structure and save the cost.

Please referring to FIG. 4a, in the liquid flow direction of the flow path 150, a horizontal center line a of the main body part 121 may be parallel to a horizontal center line b of the mounting hole 1231. In this way, the valve core 120 can form an eccentric structure. When the flat bottom ball valve is opened, a sealing ring 1212 can be quickly disengaged from the valve port 151 to avoid the abrasion of the sealing pair and reduce a torque of the valve rod 130. The eccentric structure of the valve core 120 may not only advantageously facilitate on-off of the valve core but also reduce the force for driving the valve rod 130, thereby implementing energy conservation and environmental protection.

Example 2

A valve, its kind and number being large, is as an important part of a pipeline system and has been deemed as one of the main leakage sources in a device. Thus a leakage requirement on a valve is crucial. A sealing property of a valve may refer to an ability of each of sealing parts in the valve to prevent medium leakage. Main sealing components of a valve may include: an inosculation surface between a disc and a valve seat of the valve, fitting between stuffing and a valve rod of the valve as well as a stuffing box, and a joint between a valve body of the valve and a bonnet of the valve. Here, the valve seat is mounted based on an internal shape of the valve body. A traditional vertical eccentric valve may be provided with a groove at the bottom of the valve body, so as to provide an avoiding space for mounting the valve seat. However, in this case, the flow capacity may be poor, rubbish or solid particles may be easily accumulated, which may affect the on-off property of the valve.

Figure 5:
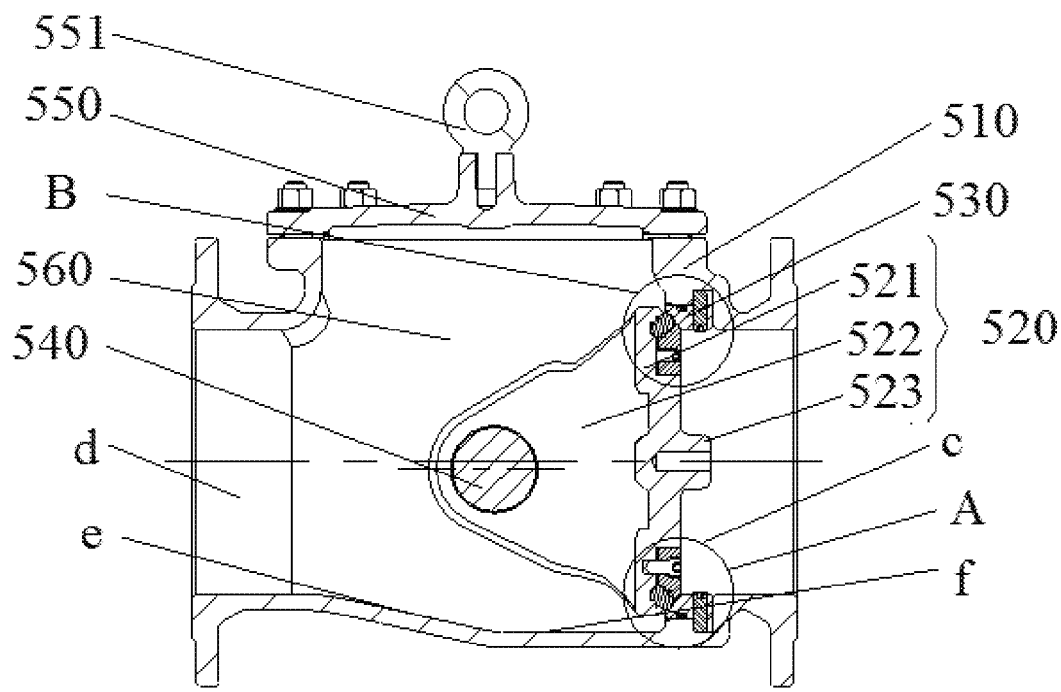
FIG. 5 schematically illustrates a section structure of a flat bottom ball valve according to Example 2 of the present disclosure.

FIG. 5 schematically illustrates a section structure of a flat bottom ball valve according to Example 2 of the present disclosure. As shown in FIG. 5, the flat bottom ball valve includes a valve body 510, a valve core 520 mounted inside the valve body 510, a valve seat 530 mounted inside the valve body 510 and hermetically engaged with the valve core 520, a valve rod 540 mounted on the valve core 520 and to drive the valve core 520 to turn over, and a bonnet 550 movably mounted above the valve body 510.

The valve body 510 includes a flow path 560 defined inside the valve body 510 and connecting two ends of the valve body 510. The two ends of the valve body 510 may be of cylindrical shapes with the same inner diameter. One of the two ends of the valve body 510 is a water inlet c, and the other of the two ends of the valve body 510 is a water outlet d. The valve rod 540 may be perpendicular to the liquid flow direction in the flow path 560 and located below the bonnet 550.

Figure 6:
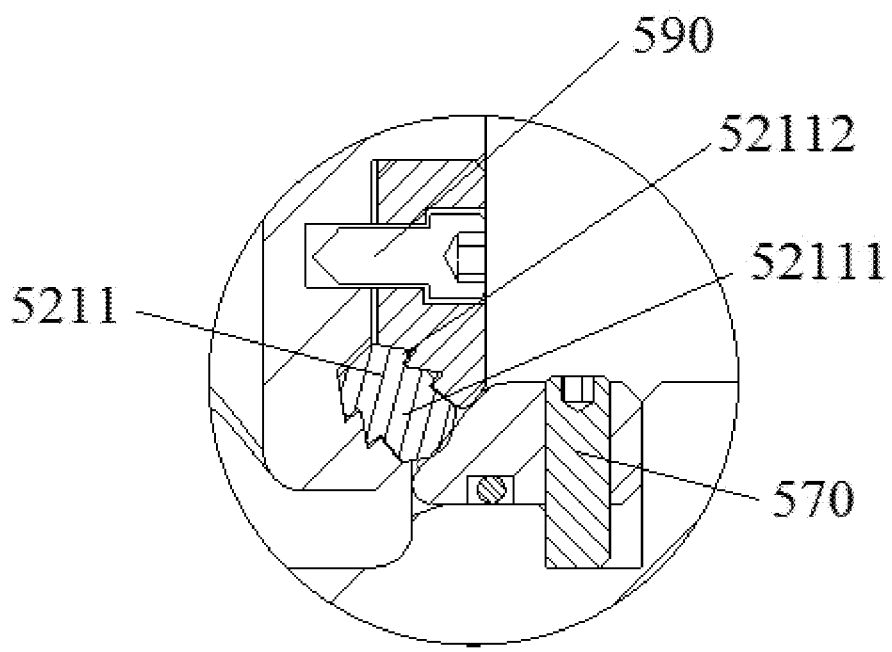
FIG. 6 schematically illustrates a partial enlarged diagram of a part A in the flat bottom ball valve shown in FIG. 5.
Figure 7:
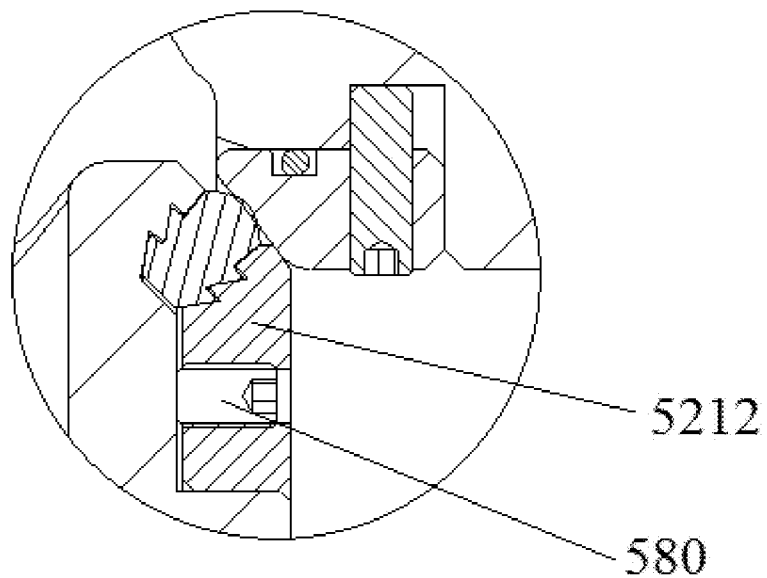
FIG. 7 schematically illustrates a partial enlarged diagram of a part B in the flat bottom ball valve shown in FIG. 5.

The valve core 520 includes a main body part 521 engaged with the valve seat 530, a connecting part 522 formed by extending symmetrically from the two sides of the main body part 521 and an accessory 523 protruding from the center of the main body part 521. FIG. 6 schematically illustrates a partial enlarged diagram of a part A in the flat bottom ball valve shown in FIG. 5. FIG. 7 schematically illustrates a partial enlarged diagram of a part B in the flat bottom ball valve shown in FIG. 5. As shown in FIG. 6 and FIG. 7, the main body part 521 of the valve core 520 may be provided with a sealing member 5211 and an adjusting cover 5212 for being hermetically engaged with the valve seat 530. The sealing member 5211 may include a sealing body 52111 abutted against the valve seat 530 and a plurality of fixing parts 52112 protruding from two sides of the sealing body 52111. A cross section of each of the fixing parts 52112 may be of a triangular shape. The fixing parts 52112 on one side of the sealing body 52111 may be engaged with the main body part 521 of the valve core 520; and the fixing parts 52112 on the other side of the sealing body 52111 may be engaged with the adjusting cover 5212. That is, the main body part 521 and the adjusting cover 5212 may be both provided with fixing grooves for mounting the fixing parts 52112. Soft seal and hard seal on the valve seat 530 may be respectively implemented through the sealing member 5211 and the adjusting cover 5212, thereby improving the sealing property. The connecting part 522 of the valve core 520 may be mounted on the valve rod 540. The valve core 520 may be rotated between the bonnet 550 and the water inlet c around the valve rod 540, so as to turn off/on the flat bottom ball valve. The main body part 521 of the valve core 520 may be of a disc shape; and when there is rubbish on an edge of the water inlet c, the main body part 521 of the valve core 520 may cut off the rubbish quickly to prevent the rubbish from being accumulated in a sealing surface of the valve core 520 and the valve seat 530 and avoid leakage of the flat bottom ball valve. The valve core 520 may be mounted inside the valve body 510 from above the valve body 510, and therefore the accessory 523 may facilitate mounting and removing the valve core 520.

A sealing ring may be arranged between the valve seat 530 and the valve body 510 to implement sealing between the valve seat and the valve body. The valve seat 530 may be mounted in the valve body 510 from above the valve body 510 and located close to the water inlet c. Since the center line of the valve seat 530 is collinear with the center line of the water inlet c, the design of the flow path has certain requirements. A bottom surface of the flow path 560 includes a bevel e connecting the water outlet d and a plane f connecting the bevel 561 with the water inlet c. The plane f may be located below the valve seat 530. The bevel e may be in a smooth transition connection with the plane f, and thus a downward-depressed and smooth avoiding space can be formed to facilitate mounting the valve seat 530. A medium flowing in the valve body 510 may wash away the rubbish and solid particles in the flow path very easily, thereby improving the flow capacity of the flat bottom ball valve.

As shown in FIG. 6 and FIG. 7, the valve seat 530 may be fixed in the valve body 510 through a plurality of first screws 570. The adjusting cover 5212 may be fixed on the main body part 521 through a plurality of second screws. The second screws may include an adjusting screw 580, which is engaged with the adjusting cover 5212 only and does not go through the valve core 520, and a fastening screw 590, which goes through the adjusting cover 5212 and is inserted into the valve core 520. The adjusting screw 580 and the fastening screw 590 may be alternately and uniformly arranged on the adjusting cover 5212. The adjusting screw 580 may provide a lateral pressure to the sealing member 5211, so as to facilitate hermetically fitting between the sealing member 5211 and the valve seat 530 and improve the sealing property. The fastening screw 590 may be used to fix and adjust the relative positions of the adjusting cover 5212 and the valve core 520.

The bonnet 550 may be fixed above the valve body 510 through a plurality of bolts. A handle 551 may be arranged on the bonnet 550 to facilitate mounting and removing the bonnet 550.

Example 3

Mounting of a valve core is an important factor for determining the sealing property of a valve. A screw may be mounted on a bearing cover to improve the sealing property of the valve, and a position of the valve core may be adjusted by adjusting a screw-in size of the screw. The position of the valve core may also be adjusted by additionally arranging a pad between the valve core and a valve rod.

Figure 8:
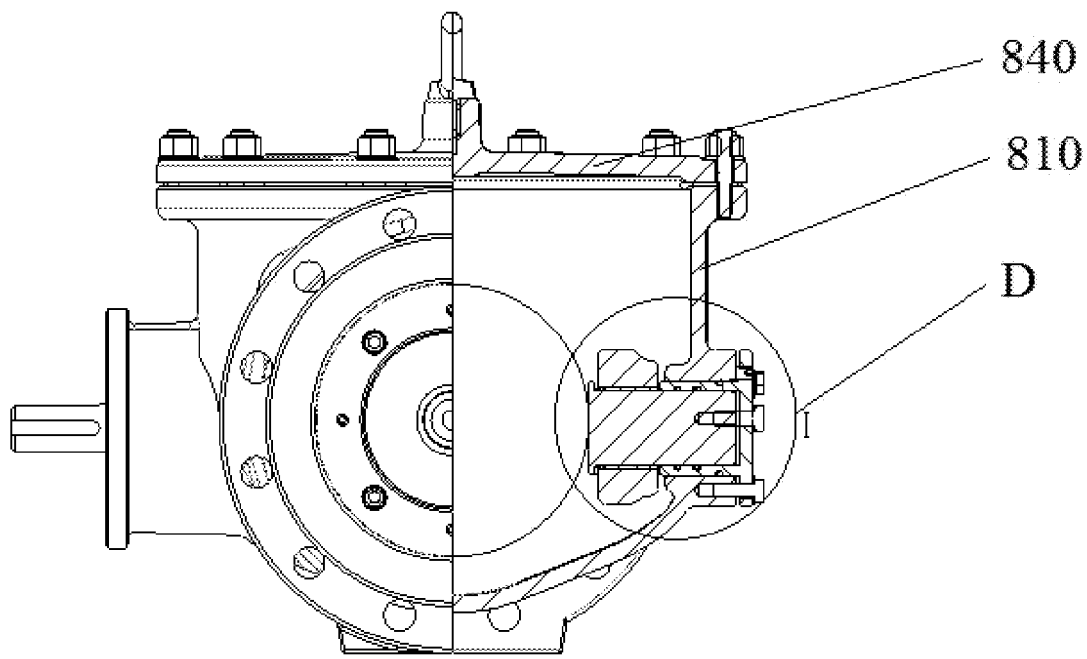
FIG. 8 schematically illustrates a half-section structure of a flat bottom ball valve according to Example 3 of the present disclosure.
Figure 9:
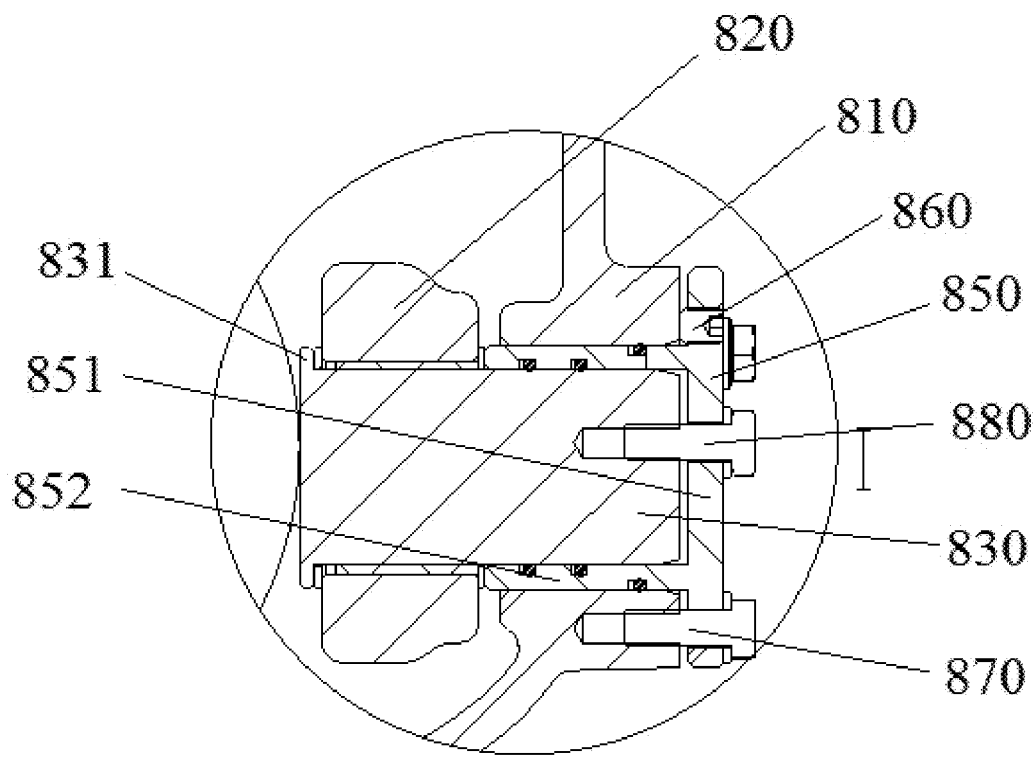
FIG. 9 schematically illustrates a partial enlarged diagram of a part D of the flat bottom ball valve shown in FIG. 8.

FIG. 8 schematically illustrates a half-section structure of a flat bottom ball valve according to still another example of the present disclosure. FIG. 9 schematically illustrates a partial enlarged diagram of a part D of the flat bottom ball valve shown in FIG. 8. As shown in FIG. 8 and FIG. 9, the flat bottom ball valve includes a valve body 810, a valve core 820 (not shown in FIG. 8), a valve rod 830 (not shown in FIG. 8) for mounting the valve core 820 inside the valve body 810, a bonnet 840 above the valve body 810, a bearing cover 850 mounted on the valve body 810 and engaged with the valve rod 830, a plurality of first adjusting screws 860 and second adjusting screws 870 for connecting the bearing cover 850 and the valve body 810, and a plurality of fixing screws 880 for connecting the bearing cover 850 and the valve rod 830.

Related description of a structure of the valve core 820 may be referred to FIG. 3, which is not described in detail here.

The valve rod 830 may be mounted on two opposite sides of the valve body 810, and thus the valve core 820 may be rotated between the bonnet 840 and the water inlet around the valve rod 830, so as to implement on-off of the flat bottom ball valve. An annular interfering part 831 may be convexly arranged at one end of the valve rod 830 engaged with the connecting part 123 shown in FIG. 2. The valve rod 830 may pass through the mounting hole 1231 shown in FIG. 2 and be fixed with the connecting part 123 through the interfering part 831. The bearing cover 850 may be mounted at one end of the valve rod 830.

The bonnet 840 may be fixed on the valve body 810 through a plurality of bolts so that components inside the valve body may be repaired online.

The bearing cover 850 may include a cover body 851 and a sealing part 852 extending from the cover body 851 into the valve body 810. The valve rod 830 may be inserted into the sealing part 852. The sealing part 852 may be hermetically engaged with both the valve body 810 and the valve rod 830. Grooves may be arranged on two sides of the sealing part respectively; and a sealing ring may be arranged in the respective grooves.

The first adjusting screw 860 may be a flush-end fastening screw, which goes through the bearing cover 850 and is abutted against the valve body 810. As the depth of the first adjusting screw 860 being screwed into the bearing cover 850 increases, the first adjusting screw 860 may be abutted against the valve body 810. The valve body 810 can provide an opposite force to the first adjusting screw 860 to push the bearing cover 850 to move away from the valve body 810, and then the valve core 820 may move together with the valve rod 830 and the bearing cover 850.

The second adjusting screw 870 may go through the bearing cover 850 and be inserted into the valve body 810. As the depth of the second adjusting screw 870 being screwed into the valve body 810 increases, the bearing cover 850 may move toward the valve body 810, and then the valve core 820 may move together with the valve rod 830 and the bearing cover 850.

The fixing screw 880 may go through the bearing cover 850 and be inserted into the valve rod 830. In this way, a linkage between the bearing cover 850 and the valve rod 830 may be implemented.

Example 4

A sealing rubber pad is one of the indispensable components in a valve to implement a sealing function. A common sealing rubber pad may be clamped between a valve body and a bonnet, without a fixing structure. When existing in the valve body, a fluid medium may generate a pressure to the sealing rubber pad. As the pressure rises, the sealing rubber pad may move toward the outside of the valve body, thereby affecting the sealing property of the valve.

Figure 10:
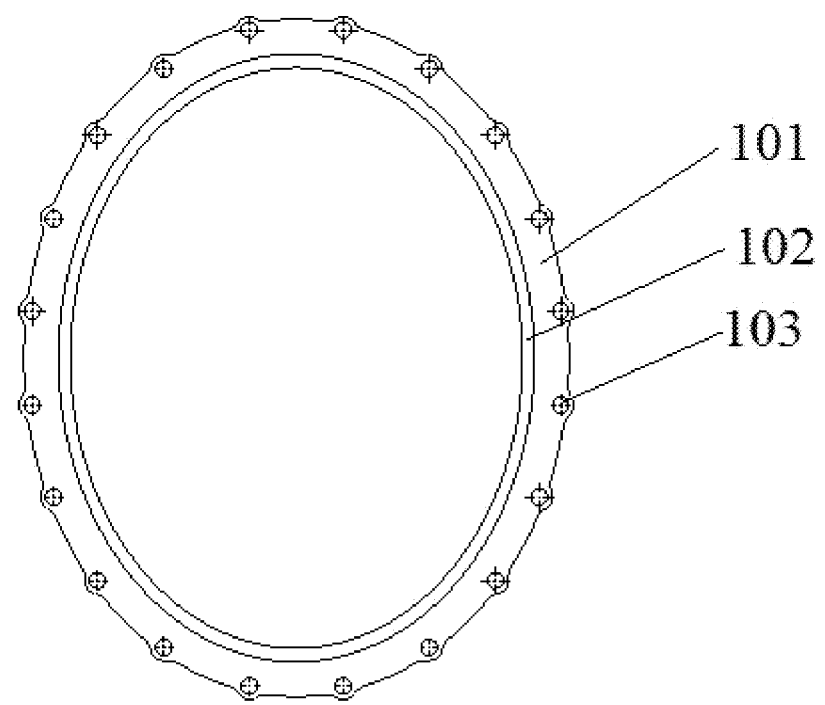
FIG. 10 schematically illustrates a structure of a sealing rubber pad according to Example 4 of the present disclosure.
Figure 11:
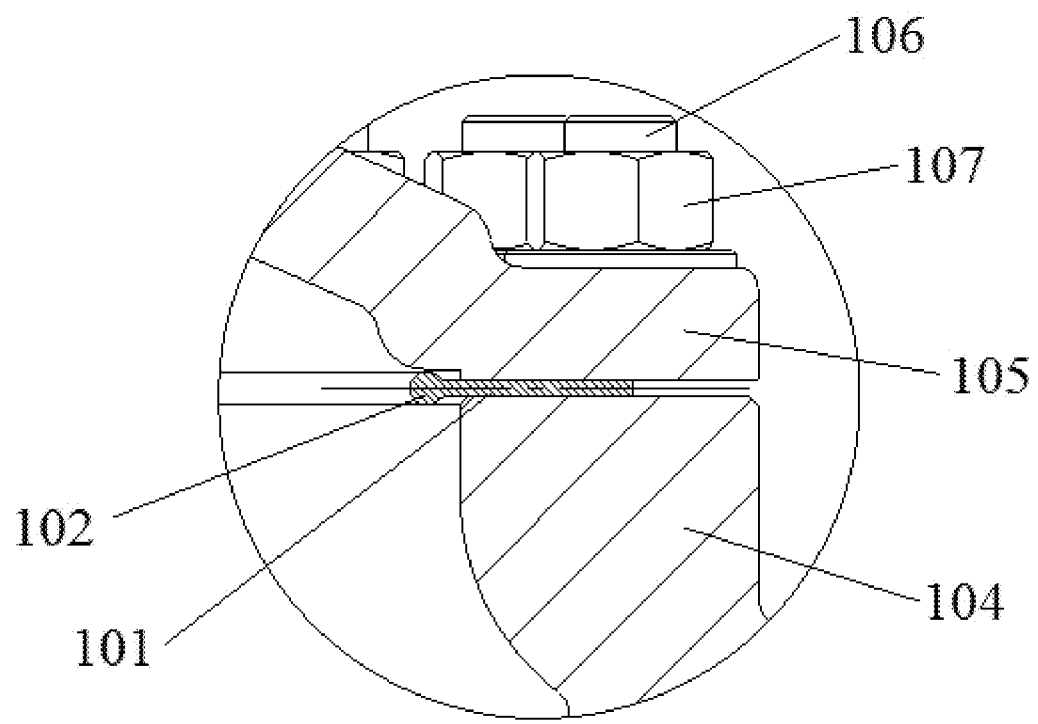
FIG. 11 schematically illustrates a structure of a flat bottom ball valve to which the sealing rubber pad shown in FIG. 10 is applied.

FIG. 10 schematically illustrates a structure of a sealing rubber pad according to Example 4 of the present disclosure. FIG. 11 schematically illustrates a structure of a flat bottom ball valve to which the sealing rubber pad shown in FIG. 10 is applied. As shown in FIG. 10, the sealing rubber pad includes a sealing body 101 and a limiting part 102 arranged on one side of the sealing body 101 and integrated with the sealing body 101. The sealing rubber pad has a center line. A distance between any side of the limiting part 102 and the center line may be greater than a distance between any side of the sealing body 1 and the center line (as shown in FIG. 11).

A cross section of the sealing body 101 may be of a rectangular shape. A plurality of mounting holes 103 may be arranged in the sealing body 101. The mounting holes 103 may be uniformly distributed in the sealing body 101.

A cross section of the limiting part 102 may be of a circular shape.

The sealing body 101 and the limiting part 102 may be both of an elliptical shape (as shown in FIG. 10).

In Example 4, the sealing rubber pad may be applied to any of the above flat bottom ball valves. With one of the flat bottom ball valves as an example, the sealing body 101 of the sealing rubber pad may be located between the valve body 104 and the bonnet 105. The limiting part 102 of the sealing rubber pad may be located inside the valve body 104 and clamped on the edges of the valve body 104 and the bonnet 105. The valve body 104 and the bonnet 105 may be connected through a bolt 106 and a nut 107. The bolt 106 may pass through one of the mounting holes 103 in the sealing body 101.

As the pressure in the valve body 104 rises, the sealing rubber pad may move outward. When the limiting part 102 contacts the internal edges of the valve body 104 and the bonnet 105, the sealing rubber pad may be prevented from being blown out.

Example 5

In Example 5, a method of assembling a flat bottom ball valve in the present disclosure may include:

1) assembling a valve seat at a water inlet located inside a valve body from an upper mounting opening of the valve body through a plurality of first screws;

2) a valve rod including a front valve rod and a rear valve rod, the front valve rod being sleeved with an outer bushing and an inner bushing arranged separately, mounting the inner bushing from the inside of the valve body into a front rod hole of the valve body;

3) mounting a sealing ring on a valve core, then pressing an adjusting cover on the sealing member, and mounting the adjusting cover on the valve core through a plurality of second screws;

4) mounting the valve core whole inside the valve body from the upper mounting opening of the valve body, and aligning a front rod hole with a rear rod hole of the valve body;

5) sleeving the front valve rod with the outer bushing, and inserting the outer bushing together with the front valve rod into the front rod hole from the outside of the valve body; further inserting the front valve rod into the valve core to engage with the valve core; then fixing the outer bushing on the valve body through a plurality of third screws; and fixing the front valve rod on the valve core through a circular cover and a fourth screw;

6) the rear valve rod passing through the valve core and the rear rod hole sequentially from the inside of the valve body, then mounting a bearing cover in the rear rod hole from the outside of the valve body through a plurality of fifth screws, and sleeving the bearing cover on the rear valve rod;

7) adjusting the fifth screws on the bearing cover to adjust a horizontal position of the valve core;

8) adjusting the second screws on the adjusting cover to reach a proper fit gap between the sealing ring on the valve core and the valve seat; and 9) mounting a plurality of bolts at the mounting opening of the valve body, then sleeving a sealing rubber pad and a bonnet on the bolts sequentially, and finally fixing the bonnet to the valve body through a fit between a plurality of nuts and the bolts.

In conclusion, the above description is merely preferred embodiments of the present disclosure and is not intended to limit the scope of the present disclosure. Any simple equivalent changes and modifications made based on the claims and specification of the present disclosure should also fall within the scope of the present disclosure.

The invention claimed is:

1. A flat bottom ball valve, comprising:
a valve body;
a valve core mounted inside the valve body;
a valve rod mounted on two opposite sides of the valve body, the valve rod being perpendicular to a liquid flow direction and capable of driving the valve core to turn over;
a bonnet movably mounted on the valve body and parallel to the valve rod; and
a flow path defined inside the valve body and connecting two ends of the valve body, wherein one of the two ends of the valve body is a water outlet, and the other is a water inlet;
wherein the valve core comprises:
a main body part;
a connecting part formed by extending symmetrically from two sides of the main body part;
an accessory defined on the main body part; and
a first mounting hole in the connecting part and used for mounting the valve rod;
wherein the valve core swings around the valve rod along a path above the valve rod, and the valve core is capable of being hermetically engaged with the valve body to turn off/on the flow path; and in a liquid flow direction of the flow path, a horizontal center line of the main body part is parallel to a horizontal center line of the first mounting hole;

wherein the main body part is of a disc shape;

the valve core further comprises a reinforcing surface;

the reinforcing surface extends vertically from a circumference of the main body part, and the connecting part is arranged on the reinforcing surface; and the main body part and the reinforcing surface form a triangle in the liquid flow direction of the flow path.

2. The flat bottom ball valve according to claim 1, wherein the main body part comprises:

an annular groove; and a first sealing ring, which is mounted in the groove and abutted against inside of the valve body, wherein a gap is left between the first sealing ring and the annular groove.

3. The flat bottom ball valve according to claim 2, wherein the first sealing ring comprises:

a first sealing part; and a plurality of first fixing parts, which are arranged on two sides of the first sealing part respectively, wherein a cross section of the respective first fixing parts is of a right-triangle shape; and a plurality of fixing grooves for accommodating the respective first fixing parts arranged in the groove of the main body part, wherein a cross section of the respective fixing grooves is also of a right-triangle shape.

4. The flat bottom ball valve according to claim 1, wherein a sealing rubber pad is arranged between the valve body and the bonnet;

the sealing rubber pad comprises a sealing body;

a limiting part integrated with the sealing body is arranged on one side of the sealing body;

the sealing rubber pad has a center line; and a distance between any side of the limiting part and the center line is greater than a distance between any side of the sealing body and the center line.

5. The flat bottom ball valve according to claim 4, wherein a cross section of the sealing body is of a rectangular shape;

a cross section of the limiting part is of a circular shape; and the sealing body and the limiting part are both of an elliptical shape.

6. The flat bottom ball valve according to claim 4, wherein the limiting part is located inside the valve body and clamped on edges of the valve body and the bonnet;

the valve body and the bonnet are connected through a plurality of bolts and a plurality of nuts; and the sealing body is provided with a plurality of second mounting holes, the bolts passing through the plurality of second mounting holes.

7. The flat bottom ball valve according to claim 1, wherein a very bottom end of a cross section of the flow path along the liquid flow direction is a straight line.

8. The flat bottom ball valve according to claim 1, wherein the flat bottom ball valve further comprises a valve seat;

the valve seat is mounted inside the valve body and located close to the water inlet, the valve seat is hermetically engaged with the valve core, and a center line of the valve seat is collinear with a center line of the water inlet; and a bottom surface of the flow path comprises a bevel connecting the water outlet and a plane connecting the bevel as well as the water inlet, the plane and the bevel is in a smooth transition connection, and the plane is located below the valve seat.

9. The flat bottom ball valve according to claim 8, wherein the valve seat is fixed in the valve body through a plurality of first screws.

10. The flat bottom ball valve according to claim 8, wherein the main body part is provided with a second sealing ring and an adjusting cover for being hermetically engaged with the valve seat; and the adjusting cover is fixed on the main body part through a plurality of second screws.

11. The flat bottom ball valve according to claim 10, wherein the second sealing ring comprises:

a second sealing part abutted against the valve seat; and a plurality of second fixing parts respectively arranged on two sides of the second sealing part, wherein a cross section of the respective second fixing parts is of a triangular shape;

the second fixing parts on one side of the second sealing part are engaged with the main body part; and the second fixing parts on the other side of the second sealing part are engaged with the adjusting cover.

12. The flat bottom ball valve according to claim 10, wherein the plurality of second screws comprise:

an adjusting screw, which is engaged with the adjusting cover only and does not go through the valve core; and a fastening screw, which goes through the adjusting cover and is inserted into the valve core.

13. The flat bottom ball valve according to claim 1, further comprising:

a bearing cover, which is mounted at one end of the valve rod and engaged with the valve rod;

a first adjusting screw, which goes through the bearing cover and is abutted against the valve body;

a second adjusting screw, which goes through the bearing cover and is inserted into the valve body; and a fixing screw, which goes through the bearing cover and is inserted into the valve rod.

14. The flat bottom ball valve according to claim 13, wherein the first adjusting screw is a flush-end fastening screw.

15. The flat bottom ball valve according to claim 13, wherein the bearing cover comprises:

a cover body; and a third sealing part extending from the cover body into the valve body, wherein the valve rod is inserted into the third sealing part, and the third sealing part is hermetically engaged with both the valve body and the valve rod.

16. The flat bottom ball valve according to claim 13, wherein one end of the valve rod engaged with the connecting part is provided with an annular interfering part convexly; and the valve rod passes through the first mounting hole in the connecting part and is fixed through the annular interfering part.

* * * * *